(12) United States Patent
Stein

(10) Patent No.: US 7,086,238 B2
(45) Date of Patent: Aug. 8, 2006

(54) OIL SEPARATOR WITH BI-DIRECTIONAL VALVE MECHANISM FOR USE WITH A REFRIGERANT RECYCLING MACHINE

(75) Inventor: Myron Stein, Laguna Niguel, CA (US)

(73) Assignee: AirSept, Inc., Marietta, GA (US)

( * ) Notice: Subject to any disclaimer, the term of this patent is extended or adjusted under 35 U.S.C. 154(b) by 247 days.

(21) Appl. No.: 10/766,234

(22) Filed: Jan. 28, 2004

(65) Prior Publication Data
US 2004/0221588 A1 Nov. 11, 2004

Related U.S. Application Data

(60) Provisional application No. 60/443,123, filed on Jan. 28, 2003.

(51) Int. Cl.
*F25B 43/02* (2006.01)
(52) U.S. Cl. .............................. 62/84; 62/149; 62/474
(58) Field of Classification Search .................... 62/84, 62/470, 474, 292, 149
See application file for complete search history.

(56) References Cited

U.S. PATENT DOCUMENTS

| | | |
|---|---|---|
| 3,578,168 A | 5/1971 | Grant |
| 3,850,009 A | 11/1974 | Villadsen |
| 5,090,211 A | 2/1992 | Peters |
| 5,127,239 A | 7/1992 | Manz et al. |
| 5,575,833 A | 11/1996 | Griffin |
| 5,675,978 A | 10/1997 | Hamm, Jr. et al. |
| 5,729,985 A * | 3/1998 | Yoshihara et al. ............. 62/81 |
| 5,761,924 A | 6/1998 | Peckjian |
| 6,223,549 B1 * | 5/2001 | Kasai ........................ 62/324.1 |
| 6,244,055 B1 | 6/2001 | Hanson et al. |
| 6,263,694 B1 * | 7/2001 | Boyko ......................... 62/468 |
| 6,338,255 B1 | 1/2002 | Richard et al. |

FOREIGN PATENT DOCUMENTS

| | | |
|---|---|---|
| GB | 576921 | 4/1946 |
| JP | 08285113 | 11/1996 |
| JP | 10311624 | 11/1998 |
| JP | 2000220916 | 8/2000 |
| WO | WO 00/35562 | 6/2000 |

* cited by examiner

*Primary Examiner*—Melvin Jones
(74) *Attorney, Agent, or Firm*—Womble Carlyle Sandridge & Rice

(57) ABSTRACT

An automotive air conditioning refrigerant recycling system incorporates an improved upstream oil separator that removes virtually all contaminating lubricants from a refrigerant stream before the refrigerant is delivered to sensitive downstream components of the recycling system. The oil separator includes a vaporizing chamber wherein refrigerant vaporizes while dissolved lubricants precipitate and a mist arrestor for trapping remaining lubricant entrained in the refrigerant vapor. The oil separator also may incorporate a temperature controller for controlling the temperature of the refrigerant stream in order to separate other contaminants such as hexane and hexane derivatives, Menthol Chloride, Isoparafins and other contaminants from the stream. A bi-directional valve allows refrigerant to move through the chamber in one direction and bypass the chamber in the opposite direction.

18 Claims, 4 Drawing Sheets

OIL SEPARATOR WITH BI-DIRECTIONAL VALVE MECHANISM FOR USE WITH A REFRIGERANT RECYCLING MACHINE

REFERENCE TO RELATED APPLICATION

Priority is hereby claimed to the filing date of U.S. provisional patent application No. 60/443,123 entitled Oil and Selective Chemical Removal Process and Device for a Refrigerant Recycling System, which was filed in the U.S. Patent Office On Jan. 28, 2003.

TECHNICAL FIELD

The inventions herein relate generally to air conditioning and more particularly to methods and devices for recycling contaminated refrigerant of automotive air conditioning systems to reclaim clean refrigerant for reuse.

BACKGROUND

The refrigerant in an automotive air conditioning system gradually can become contaminated with lubricant from the air conditioning compressor, chemicals such as certain hexane derivatives, particulate matter, moisture, and other contaminates. Commercial recycling systems for removing such contaminates from air conditioning refrigerant to reclaim clean reusable refrigerant are known. U.S. Pat. Nos. 5,575,833; 6,244,055; and 5,761,924 disclose examples of such recycling systems and are hereby incorporated by reference as if fully set forth herein. In addition, refrigerant recycling systems are available to automotive service providers from several companies including, for example, RTI Technologies, Inc. of York, Pa. RTI's website is www.rtitech.com and the contents of the website regarding refrigerant recycling systems is hereby incorporated by reference as background information.

These existing systems have been satisfactory in the past, in part because there generally was only one lubricating oil used, there were no chemical leak locating dies in the refrigerant that were incompatible with the next compressors refrigerant charge, and there were no sealants that were incompatible with both the oils-dies and the recycling equipment used. Today, however, contaminated refrigerant may contain most or all of these contaminants, which must be removed or separated from the refrigerant by a recycling system. Some of these components, if not removed, impede the removal of other contaminates.

An oil separator is a component of a modern refrigerant recycling system that typically is not the first thing encountered by contaminated refrigerant delivered to the system. The purpose of an oil separator is to separate lubricating oils (lubricants) from the refrigerant. If the lubricant is not removed from the refrigerant, the lubricant, which is an oily substance, will tend to clog and gunk up valves, filters, filter bed media, and other components of the recycling system. A typical oil separator takes the form of a canister into which contaminated refrigerant is expelled through an inlet. As the refrigerant is expelled, it vaporizes within the canister. However, since the lubricant is less volatile than the refrigerant, it does not tend to vaporize but instead generally settles to the bottom of the oil separator canister, from where it can be drained off. The remaining refrigerant vapor then is ejected from the oil separator through an outlet and delivered to downstream components of the recycling system for further recovery processes. In one commercially available oil separator, the contaminated refrigerant is ejected into the oil separator canister through a porous filter element, which "sprays" the refrigerant into the canister in the form of a fine mist to enhance and speed up the vaporization of the refrigerant in the canister.

While prior art oil separators have performed relatively well for removing lubricants from contaminated refrigerant, they nevertheless have exhibited certain shortcomings. For example, although most of the lubricant within contaminated refrigerant precipitates to the bottom of the oil separator when the refrigerant vaporizes in the container, a small percentage of the lubricant takes the form of a fine rarified mist. This lubricant mist is then entrained in the refrigerant vapor and moves out of the oil separator and downstream where it eventually still clogs valves and other components of the recycling system. Other contaminates, such as Hexane and Hexane derivatives also may be present in the form of a fine mist. Traditional oil separators generally have removed very little of these hexane and other contaminates in a refrigerant stream.

Many modern refrigerant recycling machines include a reservoir in which clean refrigerant that has been recovered with the machine is collected. When an entire charge of refrigerant from an automotive air conditioning system has been cleaned and collected in the reservoir, the clean refrigerant typically is pumped back into the automotive air conditioning system through the same hose used to draw it out of the air conditioning system, all without disconnecting the hose. In this process, the cleaned refrigerant sometimes is pumped back through an oil separator. Since, as discussed above, lubricant originally dissolved in the refrigerant has been collected in the oil separator, some of this collected lubricant can again be entrained in, and re-contaminate, the cleaned refrigerant stream as it passes in reverse direction through the oil separator. Clearly, such re-contamination is highly undesirable.

Accordingly, there exists a need for an oil separator for a refrigerant recycling system that removes virtually 100% of lubricant from a contaminated stream of air conditioning refrigerant before the stream is passed to downstream components of the recycling system. A further need exists for an oil separator that goes beyond simple lubricant separation by removing other contaminants, most notably hexane derivatives, from the refrigerant stream. A related need exists for an refrigerant oil separator for use with refrigerant recycling machines that allows reverse flow of cleaned refrigerant through the recycling machine back to an air conditioning system without being re-contaminated by the contaminates collected in the oil separator. It is to an oil separator that satisfies these and other needs that the present invention is primarily directed.

SUMMARY OF THE INVENTION

Briefly described, the present invention is an improved oil separator for a refrigerant recycling system and a recycling system that incorporates the novel oil separator. The novel oil separator disclosed herein may be applied as a replacement for the traditional oil separator. However, since there generally is at least one valve upstream of such a traditional oil separator, the oil separator of this invention also may be added as a separate component in addition to a traditional oil separator that preferably is interposed upstream (relative to extraction of contaminated refrigerant) of all valves, filters, and other components of the recycling system. This configuration is preferable, in fact, because contaminated refrigerant is subjected first to the oil separator for removal of lubricants and other contaminates before it encounters and can clog up any component of the recycling system.

The oil separator of this invention includes, in one embodiment, a vertically oriented cylindrical chamber having an inlet port and an outlet port at its top end and a lubricant drain port at its bottom end. Contaminated refrigerant is delivered to the chamber through the inlet port and is expelled into the chamber through a porous filter element, which tends to spray or atomize the contaminated refrigerant into the chamber. The porous filter element also acts as a coalescing barrier that gives the finer particles of lubricant dissolved in the refrigerant time to form into larger droplets that, under the influence of gravity, fall to the bottom of the container, where it can be drained off. Most of the dissolved lubricant thus is collected in the bottom of the chamber. Nevertheless, as discussed above, a rarified mist of lubricant remains suspended in the refrigerant vapor and does not precipitate out. In order to address this problem, before the refrigerant exits the oil separator, it passes through a special mist arrester filter incorporating a silicon impregnated filter media. The mist arrester functions to trap traces of lubricant that are still entrained in or mixed with the vaporized refrigerant in the form of the rarified mist. The special mist arrester removes substantially 100% of the remaining lubricant mist, which, itself, is only a tiny percentage of the original lubricant that contaminated the refrigerant. Thus, unlike the prior art, the oil separator of this invention is effective to remove very nearly 100% of lubricant contamination from a refrigerant stream before the stream moves to sensitive valves and other components of the recycling system, where it undergoes further recovery processes. Additional filters or absorbent columns may be added, if desired, to remove other contaminants that may be dissolved in the refrigerant. In this way, moisture may be removed as well as undesirable chemicals within the refrigerant, such as hexane derivatives and other contaminants.

Another novel aspect of the oil separator of this invention is an incorporated valve mechanism. The valve mechanism is simple in operation and functions to direct contaminated refrigerant through the chamber of the oil separator for removal of dissolved lubricants, as discussed above, as the refrigerant is drawn from an automotive air conditioning system. However, when the flow of refrigerant is reversed in order to pump clean recovered refrigerant back into the air conditioning system, the valve may be configured such that the returning refrigerant completely bypasses the interior of the oil separator. Accordingly, the cleaned refrigerant does not come into contact with any of the collected lubricants or other contaminants now present in the oil separator such that re-contamination of the cleaned refrigerant is completely eliminated.

Thus, an improved oil separator is now provided that addresses and solves the problems and shortcomings of the prior art by removing virtually 100% of contaminating lubricants and other chemicals from a stream of air conditioning refrigerant before the stream is passed on to other sensitive parts of a refrigerant recycling system. The improved oil separator includes an integral valve mechanism that eliminates re-contamination by preventing cleaned refrigerant from coming into contact with any potentially contaminated portions of the oil separator as clean recovered refrigerant is pumped back into an air conditioning system. These and other features, objects, and advantages of the invention will be better appreciated by those of skill in the art upon review of the detailed description set forth below when taken in conjunction with the accompanying drawing figures, which are briefly described as follows.

DETAILED DESCRIPTION OF THE PREFERRED EMBODIMENTS

Figure 1:
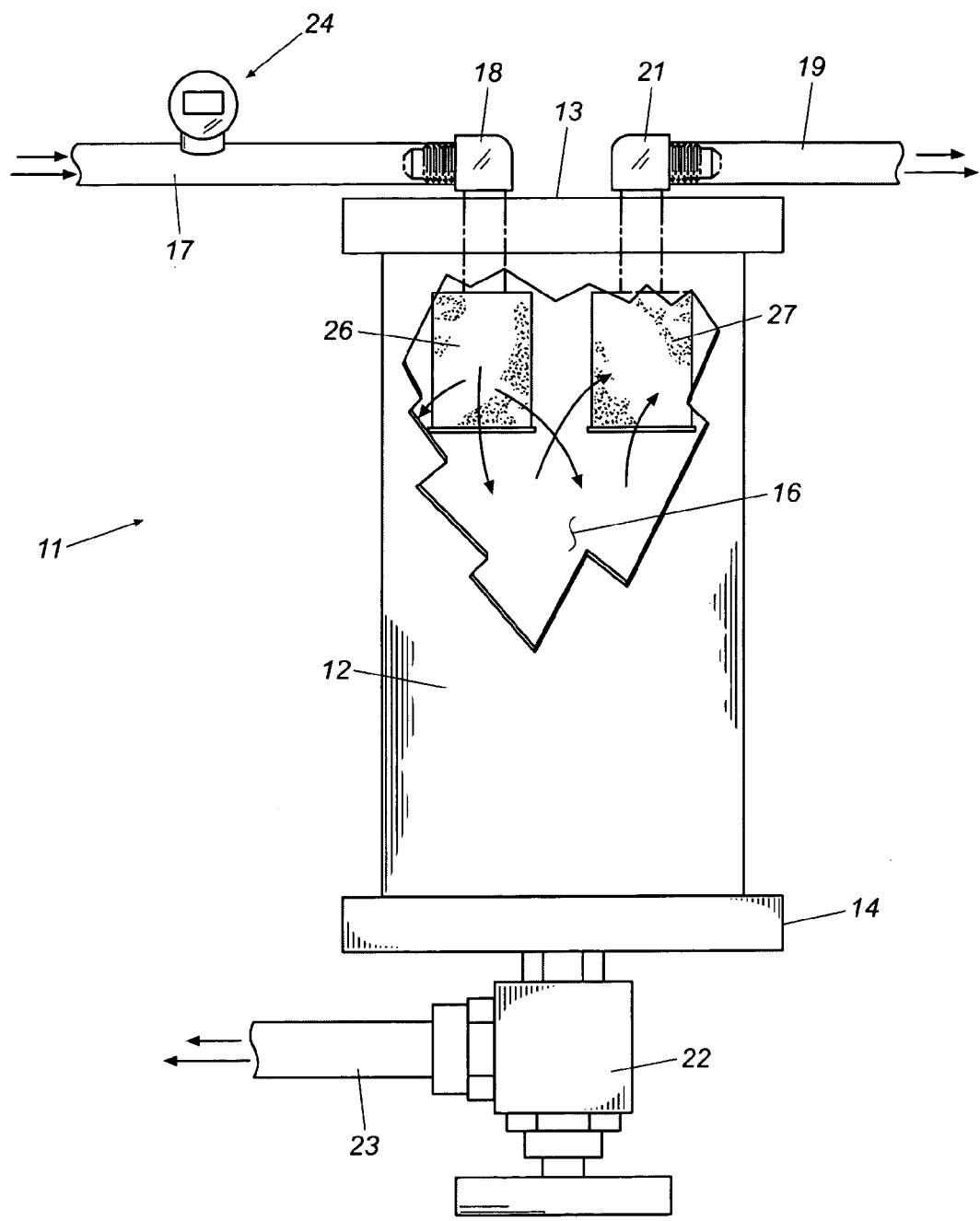
FIG. 1 is a side elevational view, partially cut away, illustrating an oil separator for a refrigerant recycling machine that embodies principles of the present invention in a preferred form.

Referring now in more detail to the drawing figures, wherein like reference numerals refer to like parts throughout the several views, FIG. 1 illustrates an oil separator that embodies principles of the present invention in one preferred form. The separator 11 comprises a cylindrical central body 12 capped and sealed at its top end with a top end plate 13 and at its bottom end with a bottom end plate 14. The body 12 and end plates 13 and 14 define a cylindrical interior chamber 16 of the oil separator. An inlet hose or conduit 17 is coupled to an inlet manifold 18 for delivering contaminated refrigerant drawn from an automotive air conditioning system to the interior camber 16. Similarly, an outlet hose 19 is coupled to an outlet manifold 21 for directing refrigerant from the oil separator to downstream components of a refrigerant recycling system after dissolved lubricant has been separated from the refrigerant by the separator. A lubricant drain valve 22 is coupled to the bottom plate 14 of the separator and is connected to a lubricant drain pipe. When lubricant is separated from contaminated refrigerant in the separator 12, it generally precipitates to the bottom of the separator and the drain valve can be selectively activated to drain collected lubricant out of the separator for disposal or other appropriate treatment.

As contaminated refrigerant enters the interior chamber 16 of the oil separator of FIG. 1 through the inlet manifold 18, it is forced through a porous filter element 26. The filter element 26 causes the refrigerant to be sprayed or misted into the chamber in multiple directions, which maximizes the exposed surface area of the refrigerant. As a result, the refrigerant quickly vaporizes when encountering the reduced pressure in the chamber because the temperature within the chamber is substantially higher than the low boiling temperature, at that reduced pressure, of the refrigerant. However, the boiling temperature of the lubricant is still substantially higher than the temperature within the chamber such that most of the lubricant remains in its liquid or semi-liquid form. Accordingly, as the refrigerant vaporizes, the lubricant that was dissolved in and contaminated the refrigerant is separated from the refrigerant and precipitated generally to the bottom of the chamber, where it collects and can be drained off.

Although a high percentage of the lubricant is separated and precipitated to the bottom of the chamber as discussed above, some lubricant nevertheless remains entrained within the now vaporized stream of lubricant. This is because, as mentioned above, a small portion of the lubricant becomes atomized into a microscopically fine rarified mist that moves along with the refrigerant vapor. In order to trap this lubricant mist, the present invention includes a mist arrester 27 through which the refrigerant vapor and rarified lubricant mist must pass before exiting the oil separator 12. The mist arrester 27 is fabricated with a filter medium that is specially designed to capture fine mists of lubricants and other substances. Specifically, the filter medium comprises a fine membrane of paper or other suitable material that is impregnated or coated with a silicone substance that attracts and bonds to the microscopic lubricant particles as the refrigerant vapor carrying the fine lubricant mist passes through the membrane. However, the refrigerant vapor passes easily through the filter medium without interaction. Thus, remaining lubricant entrained in the refrigerant vapor stream is trapped by the mist arrestor 27 while the refrigerant vapor passes unimpeded.

A filter medium that has been found to be particularly applicable for use in the present invention is available commercially from the Whatman Company of Scarborough, Maine and is designated by Whatman as its "1PS Filter Paper." Generally, the Whatman 1 PS Filter Paper is a phase separator comprising a high grade filter paper impregnated with a stabilized silicone that renders it hydrophobic, retaining the aqueous phase and passing the solvent phase through. A detailed description of this product is available at www.whatman.com, and such description is hereby incorporated by reference as if fully set forth herein. In any event, the mist arrester 27 captures virtually 100% of the remaining vapor borne lubricant mist within the refrigerant stream before the refrigerant is expelled from the oil separator through the outlet manifold 21 and outlet hose 19. As a result, delicate valves and other downstream elements of a refrigerant recycling system do not become clogged or gunked up with lubricant as has been the case in the past.

The oil separator embodiment of FIG. 1 also includes a temperature controller 24. The controller 24 is illustrated as being disposed in the inlet hose 17, which is a preferred embodiment, and is adapted to maintain the temperature of the incoming contaminated refrigerant stream at a predetermined level. It will be understood that the temperature controller can be located elsewhere in the separator such as, for instance, inside the chamber 16 itself, if desired. The purpose of the temperature controller is to maintain the temperature of the refrigerant stream at a level that is higher than the boiling point of the refrigerant but lower than the boiling point of a specific contaminant to be separated from the refrigerant at the pressure encountered by the refrigerant when it is sprayed into the chamber 16. For example, a contaminate to be removed in addition to dissolved lubricants may be hexane and hexane derivatives. In this event, the temperature controller is adjusted to maintain the temperature of the contaminated refrigerant stream between the boiling point of the refrigerant and the boiling point of hexane at the pressure in the chamber 16. As a result, when the contaminated refrigerant is ejected into the chamber 16, the refrigerant vaporizes while the hexanes and hexane derivatives remain in liquid form, agglomerate, and collect, along with the lubricant, at the bottom of the chamber. As with lubricants, some of the hexane contaminant gets entrained in the refrigerant vapor in the form of a fine mist. Again, however, the mist arrester 27 with its special filter membrane captures this hexane mist and removes it from the refrigerant stream before the stream is delivered to downstream components of a recycling system. While Hexane is presented here as the additional contaminate to be removed, the same process applies to other contaminates in addition to lubricants as well. Thus, the temperature of the incoming contaminated refrigerant can be critically controlled to remove many contaminates in the refrigerant stream before the stream is delivered downstream to a recycling machine for additional recovery processes.

Figure 2:
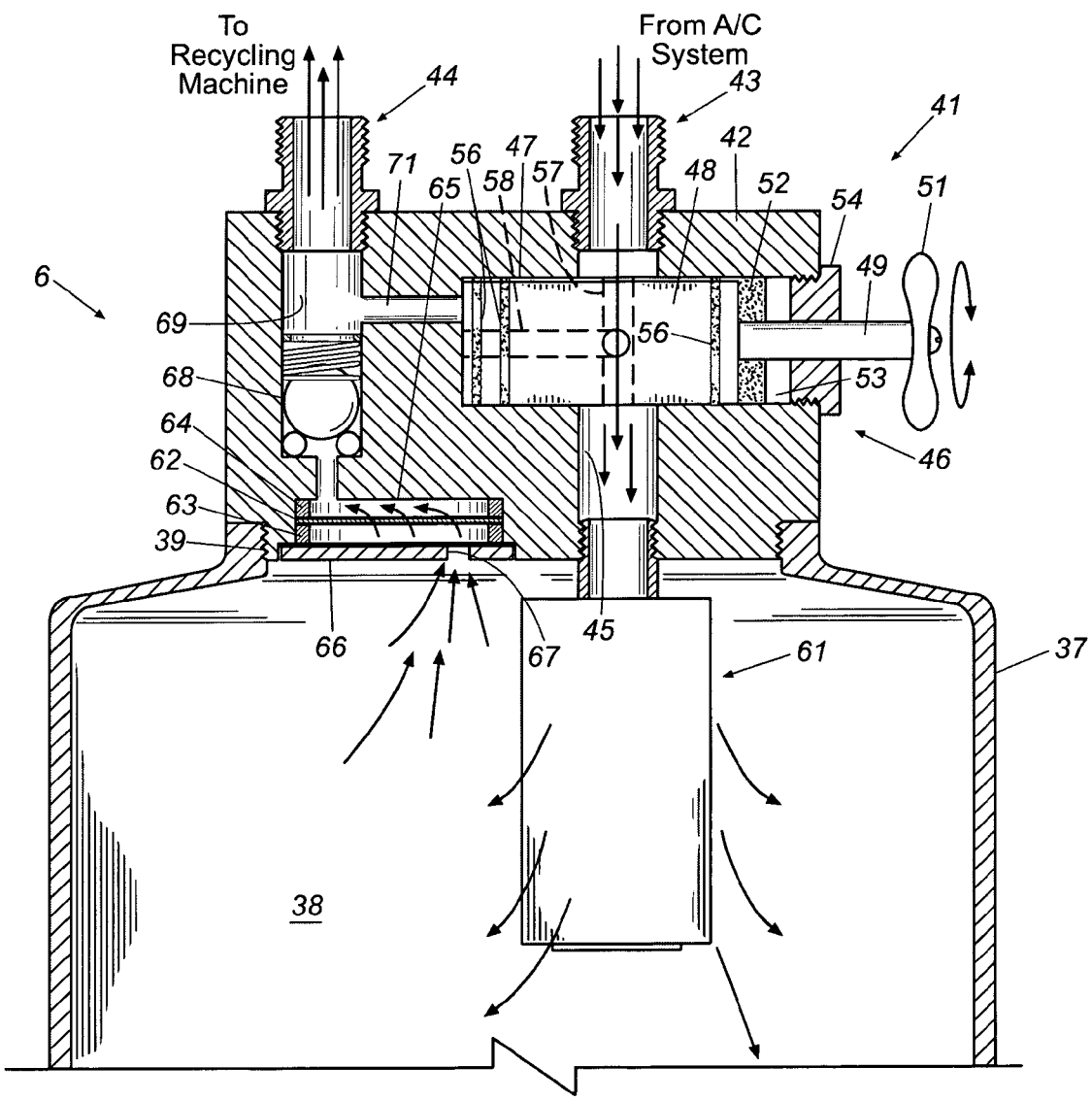
FIG. 2 is partially cross-sectioned view of an oil separator that embodies principles of the invention in an alternate form and configured for oil separation during extraction of contaminated refrigerant.
Figure 3:
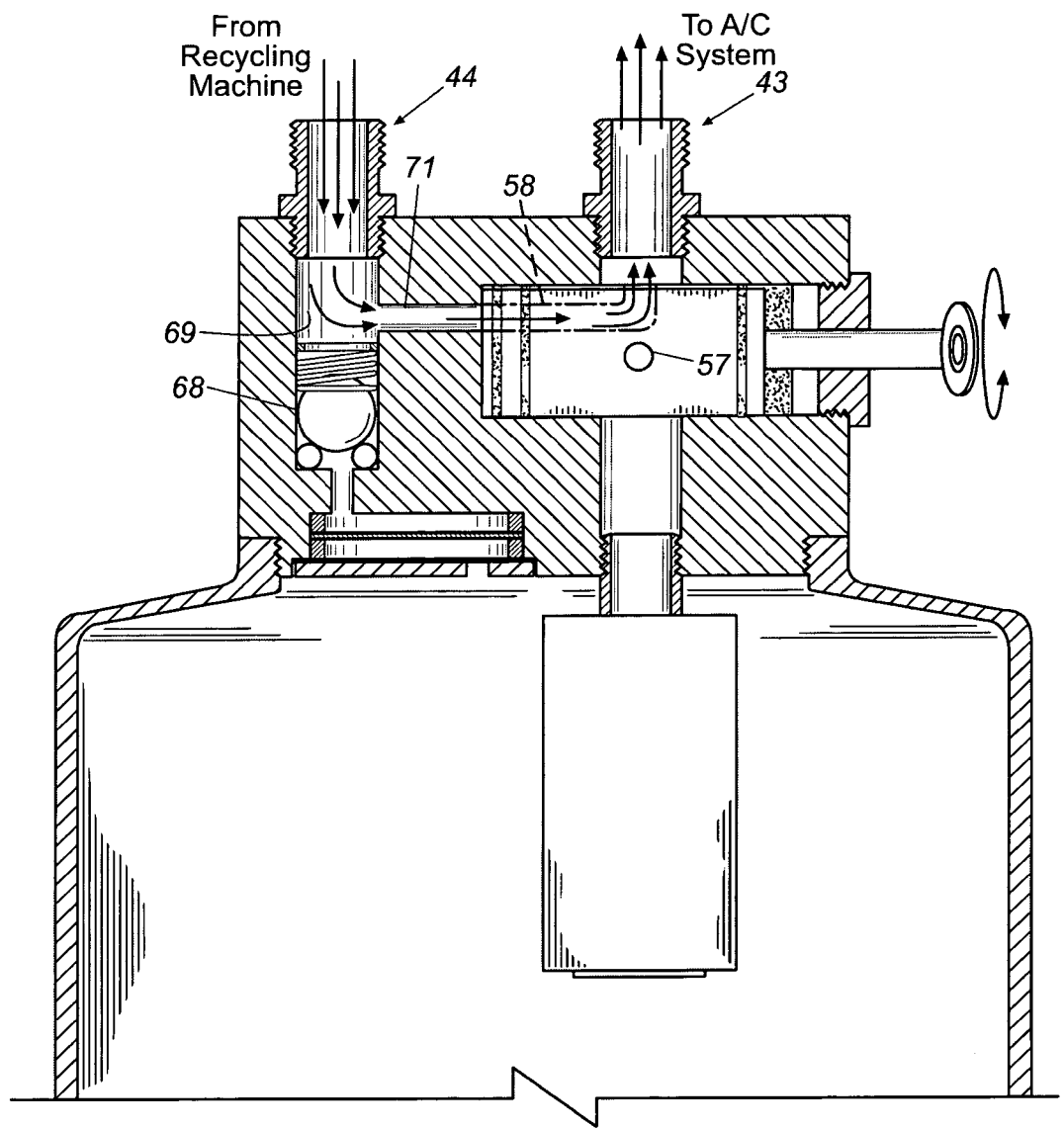
FIG. 3 is a partially cross-sectioned view of the oil separator of FIG. 2 shown configured for replacement of clean recovered refrigerant back into an air conditioning system.

FIGS. 2 and 3 illustrate an enhanced embodiment of the present invention adapted to accommodate the reverse flow of clean recovered refrigerant back into an automotive air conditioning system using the same hoses through which it was extracted. FIG. 2 illustrates this embodiment of the invention configured for the extraction process, wherein contaminated refrigerant drawn from an automotive air conditioning system passes through the oil separator for removal of lubricant and other contaminates. Conversely, FIG. 3 illustrates the same embodiment of the invention configured for reverse flow of clean recovered refrigerant back into an automotive air conditioning system. Referring first to FIG. 2, the oil separator 36 comprises a generally cylindrical canister 37 defining an interior chamber 38. Although not visible in FIG. 2, a drain valve is provided on the bottom of the container for draining off precipitated lubricant and other contaminants, just as in the embodiment of FIG. 1. The canister 37 is provided with a threaded mouth 39 on its top for receiving and coupling the canister to a threaded cap and valve assembly 41.

The cap and valve assembly 41 comprises a manifold, 42, which preferably is formed of aluminum but that may be formed of another metal or a plastic material. The manifold 42 is machined or otherwise formed to define an interior cylindrical valve chamber 47 sized to receive a rotatable cylindrical valve core 48. The valve core 48 is sized to fit snuggly within the valve chamber 47 and may be made of Teflon or another suitable plastic material, or may be metal with a sleeve of such material, in order that the valve core 48 forms a tight friction fit with the walls of the valve chamber but nevertheless is selectively rotatable within the chamber. A stem 49 projects axially from an end of the valve core to a position outside the manifold 42 and is provided on its end with a wing handle 51, with which the valve core 48 may be selectively manually rotated within the valve chamber. The valve core is held tightly within the valve chamber by seal 52, washer 53, and treaded retaining nut 49. The retaining nut 54 is tightened against the washer 53 sufficiently to assure a tight friction fit between the opposite end of the valve core and the end of the valve chamber in order to form a substantial seal there. 0-rings 56 may be provided around the valve core to enhance the seal between the valve core and valve chamber.

The manifold 42 is further formed with an inlet port 43 and an outlet port 44. The inlet port 43 communicates through passageway 45 with the bottom of the manifold 23 and with a porous filter 61 that is threaded to the bottom end of the passageway 45. The outlet port 44 is threaded in the top of passageway 69, which communicates downwardly through the manifold 42 with the chamber 38 and also through a return passageway 71 with the end of the valve chamber 47. A ball valve assembly 68 is disposed in the passageway 69 to insure one-way flow from the chamber through the passageway 69 and out the outlet port 44.

A cylindrical recess 65 is formed in the bottom of the manifold 42 communicating with the lower end of the channel 69. First and second ring spacers 63 and 64 are disposed within the recess 65 and a disc-shaped mist arrestor is sandwiched and held between the ring spacers. As discussed above, the material of the mist arrestor preferably is a Whatman 1 PS Filter Paper or phase separator, but may be any filter medium capable of capturing lubricant mist from a flow of refrigerant vapor. The ring spacers and mist arrestor are held in place within the recess 65 by a disc-shaped retainer cap 66, which is provided with an offset opening 67 for fluid flow from the chamber 38 through the fabric of the mist arrestor 63.

Figure 4:
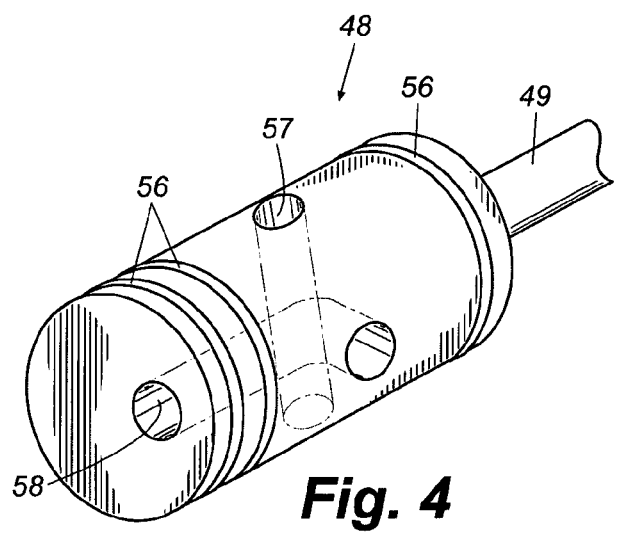
FIG. 4 is a perspective view of the unique valve core of the bi-directional valve mechanism that is a part of the present invention.

The valve core 48 is provided with a pair of internal flow control through ports 57 and 58. The configurations of these through ports is best illustrated in FIG. 4, which shows the valve core 48 in a perspective view. In FIG. 4, the valve core 48 is shown with stem 49 and O-rings 56. Through port 57 is seen to pass and communicate radially through the valve core 48 directly from one side of the valve core to the opposite side thereof. Through port 58, on the other hand, communicates from the end of the valve core 48 to the side thereof at a location that is approximately 90 degrees from the mouths of the through port 57. Furthermore, the axially extending portion of the through port 58 is radially offset from the central axis of the valve core. Thus, the through ports 57 and 58 do not intersect within the valve core but instead form two independent passageways or fluid flow conduits through the valve core. These passageways direct the flow of refrigerant through the oil separator of this invention along different paths, depending upon the rotational orientation of the valve core within the valve chamber, as described in more detail below.

Operation of the just described oil separator will now be described relative first to FIG. 2 and then to FIG. 3. As discussed above, the oil separator of this invention preferably is installed on a refrigerant recycling machine ahead of all valves and other components of the machine. It may, for instance, be installed on the outside of the machine in-line with the refrigerant flow tube that is connected to an automotive air conditioning system. In any event, FIG. 2 shows the oil separator as it is configured when contaminated refrigerant is being drawn from the automotive air conditioning system into the refrigerant recycling machine. In this configuration, the wing handle 51 is rotated until the first through port 57 is vertically aligned and provides an unobstructed fluid communication passageway from the inlet port 43 to the porous filter 61, as illustrated by the flow arrows in FIG. 2. At the same time, the second through port 58 is turned so that is misaligned with the return conduit 71 so that communication through the return conduit 71 is blocked off by the end of the valve core 48. Thus, the outlet flow path from within the chamber 38 is through the outlet hole 67 of the retainer plate 66, through the mist arrestor filter medium 62, past the check valve assembly 68, and out the outlet port 44, also as illustrated by the flow arrows.

It will thus be seen that with the valve assembly configured as shown in FIG. 2, functions in much the same was as the embodiment of FIG. 1 for separating lubricants and other contaminates from air conditioning refrigerant. To summarize, however, contaminated refrigerant is drawn from an automotive air conditioning system thorough the inlet port 43, through the first through port 57 of the valve core 48 and into the porous filter 61. The refrigerant and its dissolved contaminates are sprayed into the chamber 38 through the porous filter, where the refrigerant vaporizes while most of the lubricant and some other contaminates coalesce and settle to the bottom of the chamber. Any remaining lubricant in the form of a suspended rarified mist moves with the refrigerant vapor through the outlet hole 67 and through the mist arrestor filter medium 62, which captures near all of the remaining lubricant mist. The offset positioning of the outlet hole 67 in conjunction with the ring spacers insures that the refrigerant vapor with entrained lubricant mist is evenly dispersed over the surface of the mist arrestor filter medium 62 for most efficient separation. The refrigerant vapor, sans lubricant, them moves up past the check valve, which allows its passage in this direction, and out the outlet port 44 to be delivered to a refrigerant recycling machine.

FIG. 3 illustrates the oil separator of this invention configured for reverse flow of clean recovered refrigerant back into an automotive air conditioning system from which the refrigerant, with its now removed contaminants, originally was extracted. Here, the valve core is seen to have been rotated such that one end of the second through port 58 aligns with the return conduit 71 while the other end of the second through port aligns with the inlet port 43, which now functions as an outlet port. At the same time, the first through port 57 is rotated so that its ends face the walls of the valve chamber, rendering the first through port 57 non-functional. As cleaned recovered refrigerant flows in reverse direction from the recycling machine into the oil separator, it first encounters the check valve assembly 68, which prevents its passage into the chamber. Thus, the refrigerant is constrained to move through the return conduit 71, through the second through port 58 of the valve core, and out through the inlet (now outlet) port 43. Accordingly, the clean recovered refrigerant completely bypasses the interior of the canister and thus bypasses any elements that may be coated or covered with lubricant and other contaminants previously removed from the refrigerant. Thus, completely clean refrigerant is delivered back to the automotive air conditioning system without the possibility of being re-contaminated.

Figure 5:
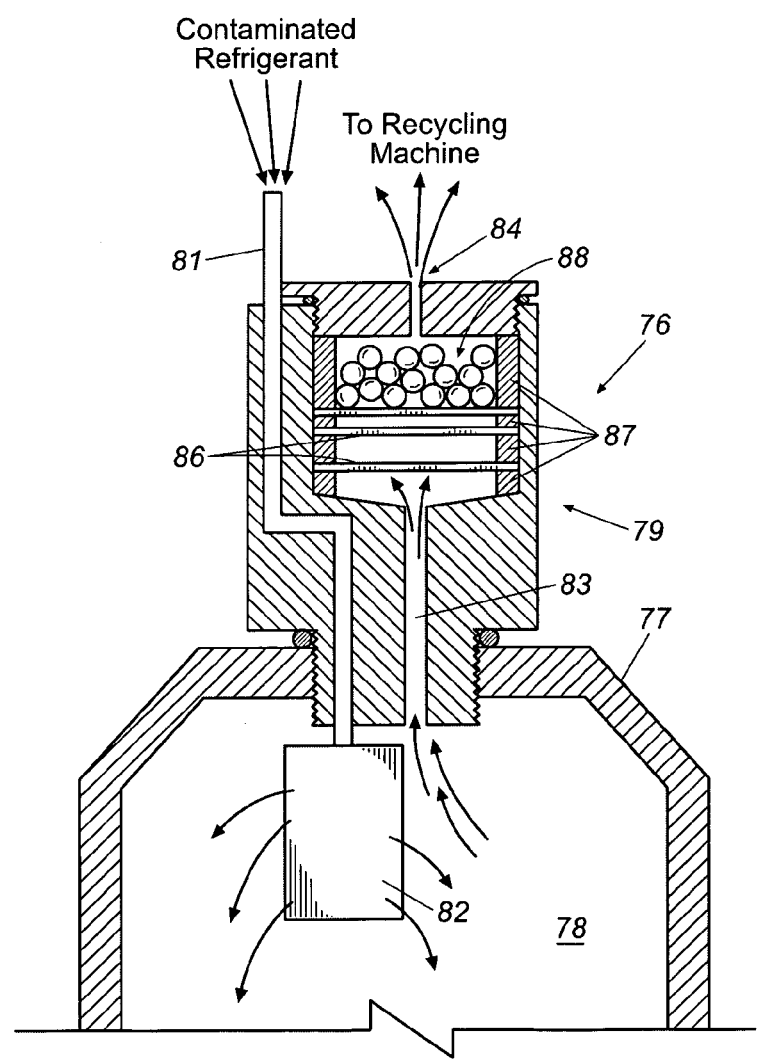
FIG. 5 is a cross-sectional view of an oil separator that embodies principles of the invention in yet another alternate embodiment wherein multiple and multi-purpose filter media is used to extract additional contaminates from the refrigerant stream.

FIG. 5 illustrates yet another embodiment of this invention that includes a multiple stage filter assembly built into a cap that threads onto the top of a canister. The drawing of FIG. 5 is somewhat simplified for ease of discussion, but may include a valve mechanism and other fittings omitted from the drawing of FIG. 5. In general, contaminated refrigerant is drawn from an automotive air conditioning system though inlet conduit 81 and is sprayed into chamber 78 through porous filter 82. Here, much of the lubricant and perhaps other contaminates are separated from the refrigerant as the refrigerant vaporizes and the contaminates precipitate. The refrigerant vapor and remaining lubricant and contaminates in mist form them move up the outlet passage 83 and through a multiple element filter stack. In this embodiment, the filter stack comprises multiple filter elements and filter media 86 separated by spacer rings 87. For example, the first or lowest filter may be a mist arrestor as discussed above while the second filter may be a water vapor barrier to remove water from the refrigerant stream. The third filter media 88 may be another type of filter such as, for instance, an HC column for separating and removing common inorganic anions and oxyhalides from the refrigerant vapor flow. Additional and/or different filters may be provided in the stack for removing a wide variety of contaminants from the refrigerant stream before the refrigerant is delivered to the recycling machine to be subjected to other recovery processes.

The invention has been described herein in terms of preferred embodiments and methodologies considered by the inventor to be the best mode of carrying out the invention. It will be clear to those of skill in the art, however, that various additions, deletions, and modification might be made to the illustrated embodiments without departing from the spirit and scope of the invention. For instance, the porous filter and mist arrester of the invention have been illustrated in specific shapes and configurations. Clearly, these filters might take on other shapes or be located in other positions with comparable results. Filter media other than the specific paper disclosed herein might also be used as long as it has the characteristics or separating and removing fine mists of lubricant from a refrigerant vapor stream. The configuration of the separator also might be different from that illustrated in the drawings. Furthermore, the separator has been illustrated as a pre-filter for a refrigerant recycling machine, which is its preferred use. However, this technology may be adapted to filtering or pre-filtering a wide range of substances. For example, the invention may be used as a filter on an air conditioning compressor or a standard compressed air compressor. Accordingly, the particular use of the invention illustrated herein should not be interpreted as a limitation of the invention. These and other modifications might be made by skilled artisans and all should be considered to be within the scope of the present invention.

What is claimed is:

1. An apparatus for separating dissolved lubricant from a stream of refrigerant, said apparatus comprising:
    a chamber;
    a refrigerant inlet communicating with said chamber for delivering lubricant bearing refrigerant to said chamber, the refrigerant vaporizing as it is delivered to said chamber leaving un-vaporized lubricant to precipitate within the chamber;
    an outlet communicating with said chamber for delivering refrigerant vapor from said chamber to a downstream location; and
    a mist arrester associated with said outlet and through which refrigerant vapor passes as it flows from said chamber;
    said mist arrester separating from the refrigerant vapor remaining lubricant that is entrained in the refrigerant vapor flow.

2. An apparatus for separating dissolved lubricant from a stream of refrigerant as claimed in claim 1 and further comprising a porous filter through which contaminated refrigerant passes as it is delivered to said chamber for aerating the refrigerant into the chamber to enhance vaporization thereof.

3. An apparatus for separating dissolved lubricant from a stream of refrigerant as claimed in claim 1 and wherein said mist arrester is a filter paper.

4. An apparatus for separating dissolved lubricant from a stream of refrigerant as claimed in claim 2 and wherein said filter paper is impregnated with a hydrophobic substance.

5. An apparatus for separating dissolved lubricant from a stream of refrigerant as claimed in claim 4 and wherein said hydrophobic substance includes silicone.

6. An apparatus for separating dissolved lubricant from a stream of refrigerant as claimed in claim 5 and wherein said filter paper is a Whatman 1 PS filter paper.

7. An apparatus for separating dissolved lubricant from a stream of refrigerant as claimed in claim 1 and wherein said apparatus further comprises a valve selectively operable to allow forward flow of contaminated refrigerant through said chamber and said mist arrester for cleaning said refrigerant and reverse flow of cleaned refrigerant bypassing said chamber.

8. A method of separating dissolved lubricant from a contaminated refrigerant, said method comprising the steps of:
    (a) injecting the contaminated refrigerant into a chamber by forcing the contaminated refrigerant through a porous filter within the chamber to atomize the refrigerant such that said refrigerant substantially vaporizes within the chamber while a portion of the dissolved lubricant remains liquid;
    (b) allowing the liquid lubricant to precipitate within the chamber to separate the lubricant from the refrigerant vapor;
    (c) passing the substantially vaporized refrigerant and any remaining lubricant suspended therein through a mist arrestor to separate the remaining lubricant from the refrigerant; and
    (d) extracting the refrigerant from the chamber for further processing.

9. A method of separating dissolved lubricant from a contaminated refrigerant as claimed in claim 8 and wherein step (c) includes passing the substantially vaporized refrigerant through a hydrophobic filter medium.

10. A method of separating dissolved lubricant from a contaminated refrigerant as claimed in claim 9 and wherein the filter medium is impregnated with a hydrophobic substance.

11. A method of separating dissolved lubricant from a contaminated refrigerant as claimed in claim 10 and wherein the hydrophobic substance includes silicone.

12. A method of separating dissolved lubricant from a contaminated refrigerant as claimed in claim 10 and wherein the hydrophobic filter medium is a Whatman 1 PS filter.

13. An apparatus for separating a dissolved contaminate from a flow of volatile fluid, said apparatus comprising a chamber, an inlet port for injecting the volatile fluid flow into said chamber, an atomizer associated with said inlet port for atomizing the volatile fluid as it is ejected into said chamber in such a way that the fluid at least partially vaporizes while the contaminate remains at least partially liquid, an outlet port for extracting partially vaporized fluid from said chamber, and a mist arrester arranged such that said partially vaporized fluid passes through said mist arrester before exiting said chamber, said mist arrestor separating remaining traces of contaminate from said partially vaporized fluid.

14. An apparatus for separating a dissolved contaminate from a flow of volatile fluid as claimed in claim 13 and wherein the fluid is a refrigerant.

15. An apparatus for separating a dissolved contaminate from a flow of volatile fluid as claimed in claim 14 and wherein said contaminate includes an lubricant.

16. An apparatus for separating a dissolved contaminate from a flow of volatile fluid as claimed in claim 13 and further comprising a bi-directional valve associated with said apparatus, said valve having a first configuration allowing fluid flow through said chamber and a second configuration wherein fluid flow bypasses said chamber.

17. A method of separating dissolved lubricant from a contaminated refrigerant, said method comprising the steps of:
    (a) injecting the contaminated refrigerant into a chamber such that said refrigerant substantially vaporizes within the chamber while a portion of the dissolved lubricant remains liquid;
    (b) allowing the liquid lubricant to precipitate within the chamber to separate the lubricant from the refrigerant vapor;
    (c) passing the substantially vaporized refrigerant and any remaining lubricant suspended therein through a mist arrestor including a hydrophobic filter medium to separate the remaining lubricant from the refrigerant; and (d) extracting the refrigerant from the chamber for further processing.

18. An apparatus for separating a dissolved contaminate from a flow of volatile fluid, said apparatus comprising a chamber, an inlet port for injecting the volatile fluid flow into said chamber in such a way that the fluid at least partially vaporizes while the contaminate remains at least partially liquid, an outlet port for extracting partially vaporized fluid from said chamber, a bi-directional valve having a first configuration allowing fluid flow through said chamber and a second configuration wherein fluid flow bypasses said chamber, and a mist arrester arranged such that said partially vaporized fluid passes through said mist arrester before exiting said chamber, said mist arrestor separating remaining traces of contaminate from said partially vaporized fluid.

* * * * *